(12) United States Patent
Kenington et al.

(10) Patent No.: US 8,441,966 B2
(45) Date of Patent: May 14, 2013

(54) ACTIVE ANTENNA ARRAY AND METHOD FOR CALIBRATION OF RECEIVE PATHS IN SAID ARRAY

(75) Inventors: Peter Kenington, Chepstow (GB); Dirk Neumann, Ulm (DE)

(73) Assignee: Ubidyne Inc., Wilmington, DE (US)

( * ) Notice: Subject to any disclaimer, the term of this patent is extended or adjusted under 35 U.S.C. 154(b) by 425 days.

(21) Appl. No.: 12/751,391

(22) Filed: Mar. 31, 2010

(65) Prior Publication Data

US 2011/0243036 A1   Oct. 6, 2011

(51) Int. Cl.
*H04B 1/44* (2006.01)

(52) U.S. Cl.
USPC .......................................................... 370/282

(58) Field of Classification Search .................. None
See application file for complete search history.

(56) References Cited

U.S. PATENT DOCUMENTS

| | | | |
|---|---|---|---|
| 6,480,153 | B1 | 11/2002 | Jung et al. |
| 6,693,588 | B1 | 2/2004 | Schlee |
| 7,102,569 | B2 | 9/2006 | Tan et al. |
| 7,106,249 | B2 | 9/2006 | Kubo et al. |
| 7,205,936 | B2 | 4/2007 | Park et al. |
| 7,292,877 | B2 | 11/2007 | Yoon et al. |
| 7,467,083 | B2 | 12/2008 | Kondo et al. |
| 8,009,095 | B2 | 8/2011 | Schlee et al. |
| 8,154,452 | B2 | 4/2012 | Webb |
| 8,184,606 | B2 | 5/2012 | Bang et al. |
| 2004/0063469 | A1 | 4/2004 | Kuwahara et al. |
| 2004/0088610 | A1 | 5/2004 | Kobayakawa |
| 2004/0142729 | A1 | 7/2004 | Yuda et al. |
| 2005/0140546 | A1 | 6/2005 | Park et al. |
| 2005/0220310 | A1 | 10/2005 | McGarth |
| 2006/0019712 | A1* | 1/2006 | Choi .......................... 455/562.1 |
| 2006/0135111 | A1* | 6/2006 | Jensen ........................ 455/334 |
| 2006/0141955 | A1* | 6/2006 | Karjalainen et al. ....... 455/114.3 |
| 2006/0183504 | A1 | 8/2006 | Tanaka et al. |
| 2009/0291632 | A1* | 11/2009 | Braithwaite et al. .............. 455/7 |

FOREIGN PATENT DOCUMENTS

| | | |
|---|---|---|
| EP | 938204 | 8/1999 |
| EP | 1085684 | 3/2001 |
| EP | 1178562 | 2/2002 |
| EP | 1187354 | 3/2002 |
| EP | 1615291 | 1/2006 |
| EP | 1329983 | 10/2006 |
| EP | 1585231 | 10/2009 |

(Continued)

OTHER PUBLICATIONS

International Search Report & Written Opinion issued in PCT/EP2011/054923 on Jun. 7, 2011.

(Continued)

*Primary Examiner* — Chirag Shah
*Assistant Examiner* — Amar Persaud

(57) ABSTRACT

An active antenna array for a mobile communications system is disclosed which comprises a plurality of receive paths in which an individual one of the receive paths is connected between an antenna element and an analogue to digital converter and wherein the analogue to digital converter digitises a receive signal to form a digitised receive signal. The active antenna array further comprises a sounding signal generator for generating a sounding signal in which the sounding signal is supplied to at least two of the plurality of receive paths and a receive signal subtraction device for subtracting a wanted signal from the digitised receive signal.

19 Claims, 6 Drawing Sheets

FOREIGN PATENT DOCUMENTS

| | | |
|---|---|---|
| EP | 1608082 | 8/2010 |
| EP | 1906554 | 10/2010 |
| WO | 95/34103 | 12/1995 |
| WO | 03/028248 | 4/2003 |
| WO | 2009060598 | 5/2009 |

OTHER PUBLICATIONS

Extended European Search Report for EP Appl. No. 11160335.3 issued on Apr. 19, 2012.

* cited by examiner

ACTIVE ANTENNA ARRAY AND METHOD FOR CALIBRATION OF RECEIVE PATHS IN SAID ARRAY

CROSS-REFERENCE TO RELATED APPLICATIONS

This application is related to U.S. patent application Ser. No. 12/751,368, entitled: ACTIVE ANTENNA ARRAY AND METHOD FOR CALIBRATION OF THE ACTIVE ANTENNA ARRAY, filed Mar. 31, 2010 and U.S. patent application Ser. No. 12/751,342, entitled: ACTIVE ANTENNA ARRAY AND METHOD FOR CALIBRATION OF THE ACTIVE ANTENNA ARRAY, filed Mar. 31, 2010.

The entire disclosure of each of the foregoing applications is incorporated by reference herein.

FIELD OF THE INVENTION

The field of the invention relates to an active antenna array and a method for calibration of a plurality of receive paths in the active antenna array.

BACKGROUND OF THE INVENTION

The use of mobile communications networks has increased over the last decade. Operators of the mobile communications networks have increased the number of base stations in order to meet an increased demand for service by users of the mobile communications networks. The operators of the mobile communications network wish to reduce the running costs of the base station. One option to do this is to implement a radio system as an antenna-embedded radio forming an active antenna array. Many of the components of the antenna-embedded radio may be implemented on one or more chips.

SUMMARY OF THE INVENTION

This disclosure provides for an active antenna array for a mobile communications system that comprises a plurality of receive paths. An individual one of the receive paths is connected between an antenna element and an analogue to digital converter, whereby the analogue to digital converter digitises a receive signal to form a digitised receive signal. A sounding signal generator is provided for generating a sounding signal. The sounding signal is supplied to at least two of the plurality of receive path and a receive signal subtraction device for subtracting a wanted signal from the digitised receive signal.

The use of the sounding signal enables the one or more of the plurality of receive paths to be calibrated.

In one aspect of the invention the active antenna array further comprises a sounding signal subtraction device for subtracting the sounding signal from the digitised receive signal to form a wanted signal. This allows the wanted signal to be accurately reproduced without interference from the sounding signal.

It is possible to use different types of sounding signals to calibrate the receive paths. The sounding signal generator could, for example, be adapted to produce a plurality of inter-band sounding signals or broad-brand sounding signals. The choice of the type of sounding signal is dependent on a number of factors, included the frequency of the carrier signals and the strength of the carrier signals.

In another aspect of the disclosure one of the receive paths is used as a reference receive path against which other ones of the receive paths are calibrated.

The active antenna array advantageously further comprises a duplex filter between the analogue to digital converter and the antenna element. The duplex filter is adapted to enable transmit signals to be transmitted on the antenna element as well as receive signals to be received on the same antenna element.

In a further aspect of the invention, the active antenna further comprises a receive signal correlator and control system for adjusting one of the phase, amplitude or vector of the digitised receive system. Similarly the active antenna array may further comprise a sounding signal correlator and control system for adjusting one of the phase, amplitude or vector of the sounding signal.

The disclosure also teaches a method for calibration of a plurality of receive paths carrying receive signals which comprises generating a sounding signal, converting the sounding signal to form a pilot signal in an analogue domain, injecting the pilot signal into at least two of the plurality of receive paths, digitising the receive signals and the pilot signal to form a digitised receive signal and subtracting a wanted signal from the digitised receive signal to form a correlation signal.

In one aspect of the invention, the method further comprises subtracting the sounding signal from the digitised receive signal to form the wanted signal.

The method also enables generating parameters for processing the wanted signal, wherein the parameters are generated using the correlation signal. This allows an accurate wanted signal to be generated from the receive signal.

One aspect of the method enables one of the receive paths to be a preferential receive path and the parameters are generated by reference to the preferential receive path.

The disclosure also teaches a computer program product comprising a non-transitory computer-usable medium, such as but not limited to solid state memory or a removable storage medium, having control logic stored therein for causing a computer to manufacture an active antenna array for a mobile communications network comprising:

a plurality of receive paths, the receive path being connected between an antenna element and an analogue to digital converter, the analogue to digital converter digitising a receive signal;
a sounding signal generator for generating a sounding signal;
a digital to analogue converter for converting the calibration signal to a pilot signal, wherein the pilot signal is supplied to the at least two of the plurality of receive paths; and
a receive signal subtraction device for subtracting a wanted signal from the digitised receive signal.

In a further aspect of the invention a computer program product is disclosed which comprises a non-transitory computer-usable medium, such as but not limited to solid state memory or a removable storage medium, having control logic stored therein for causing an active antenna to execute a method for receiving a plurality of individual radio signals comprising:

first computer readable code means for generating a calibration signal;
second computer readable code means for converting the calibration signal to form a pilot signal in an analogue domain;
third computer readable code means for injecting the pilot signal into at least two of the plurality of receive paths;
fourth computer readable control means for digitising the receive signals and the pilot signal to form a digitised receive signal; and fifth computer readable control means for subtracting the wanted signal from the digitised receive signal to form a correlation signal.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
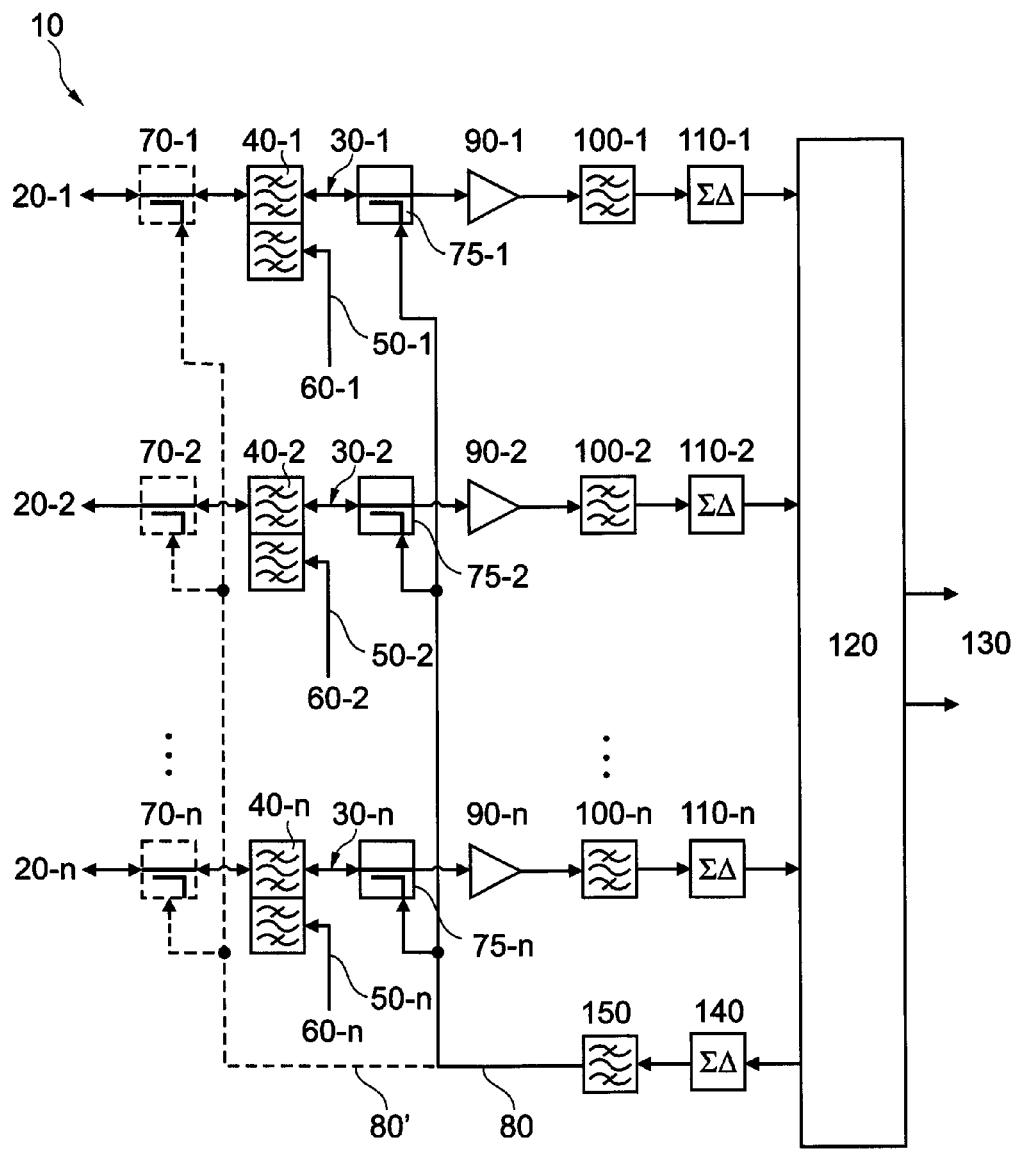
FIG. 1 shows an overview of a calibration scheme according to two aspects of the disclosure.

FIG. 1 shows an active antenna array 10 according to two aspects of this disclosure. The active antenna array 10 has a plurality of antenna elements 20-1, 20-2, . . . , 20-n which are connected to a plurality of receive paths 30-1, 30-2, . . . , 30-n. A duplex filter 40-1, 40-2, . . . , 40-n is connected between the antenna element 20-1, 20-2, . . . , 20-n in each individual one of the receive paths 30-1, 30-2, . . . , 30-n. The function of the duplex filter 40-1, 40-2, . . . , 40-n is to pass either a receive signal received from one of the plurality of antenna elements 20-1, 20-2, . . . , 20-n along to the receive path 30-1, 30-2, . . . , 30-n or to accept a transmit signal over a transmission path 50-1, 50-2, . . . , 50-n which is generated by one of a plurality of transmitters 60-1, 60-2, . . . , 60-n.

The first coupler 70-1, 70-2, . . . , 70-n is located between the duplex filter 40-1, 40-2, . . . , 40-n and the antenna element 20-1, 20-2, . . . , 20-n. The second coupler 75-1, 75-2, . . . , 75-n is located downstream of the duplex filter 40-1, 40-2, . . . , 40-n. It will be noted that each one of the receive paths 30-1, 30-2, . . . , 30-n has only one of the first coupler 70-1, 70-2, . . . , 70-n or the second coupler 75-1, 75-2, . . . , 75-n. The first coupler 70-1, 70-2, . . . , 70-n or the second coupler 75-1, 75-2, . . . , 75-n are connected to a sounding signal path 80 or 80' and are used to inject an analogue sounding signal into the receive paths 30-1, 30-2, . . . , 30-n. The function of the sounding signal path 80 or 80' will be explained in more detail later.

A low noise amplifier 90-1, 90-2, . . . , 90-n is connected in each one of the plurality of receive paths 30-1, 30-2, . . . , 30-n and amplifies the receive signals received on the receive path 30-1, 30-2, . . . , 30-n from the plurality of the antenna elements 20-1, 20-2, . . . , 20-n, as well as the injected sounding signal to produce an amplified receive signal. A band pass filter 100-1, 100-2, . . . , 100-n is located at the output of the low noise amplifiers 90-1, 90-2, . . . ,90-n in order to remove out-of-band signals from the amplified receive signal. A delta-sigma analogue-to-digital convertor 110-1, 110-2, . . . , 110-n is connected at the output of the band pass filter 100-1, 100-2, . . . , 100-n and to the input of a digital signal processor 120. The output of the delta-sigma analogue-to-digital convertor 110-1, 110-2, . . . , 110-n is a digital receive signal.

The aspect of the invention in FIG. 1 includes n individual receive paths 30-1, 30-2, . . . , 30-n. It will however be appreciated by the person skilled in the art that the number of receive paths can be changed. In a typical implementation there will be eight or sixteen receive paths 30-1, 30-2, . . . , 30-n, but this is not limiting of the invention. It will be explained later with reference to FIGS. 3 and 4 that one of the receive paths 30-1, 30-2, . . . , 30-n can be used as a reference path 30-r.

The sounding signal path 80 or 80' is also connected to the digital signal processor 120 through a delta-sigma digital-to-analogue convertor (DAC) 140 and a second band pass filter 150. The purpose of the second band pass filter 150 is to remove unwanted out-off-band signals from the analogue instantiation of the sounding signal received from the DAC 140. Generation of the sounding signal, received at the input to the DAC 140, will be explained later in connection with FIG. 2.

It will be noted in FIG. 1 that the sounding signal is shown being generated within the digital signal processor 120. It will be understood that this is not limiting of the invention and that the pilot signal could be generated by another component and supplied to the digital signal processor 120 as well as to each and all of the individual receive paths 30-1, 30-2, . . . , 30-n.

The function of the digital signal processor 120 will now be explained in connection with FIG. 2. The output of the digital signal processor 120 is I/Q base band output signals 130. These base band output signals 130 can be passed for further signal processing. It will be appreciated that the digital signal processor 120 is shown as a stand-alone component in FIG. 1 and as a series of signal processing functions in FIG. 2. A complete active antenna array 10 would contain many other signal processing functions and these could also be implemented in the same digital signal processor 120. These many other signal processing functions are omitted in FIG. 2 and subsequent figures for clarity. The I/Q baseband output signals 130, shown in FIG. 2, could feed, internally to the digital signal processor 120, these many other signal processing functions.

Figure 2:
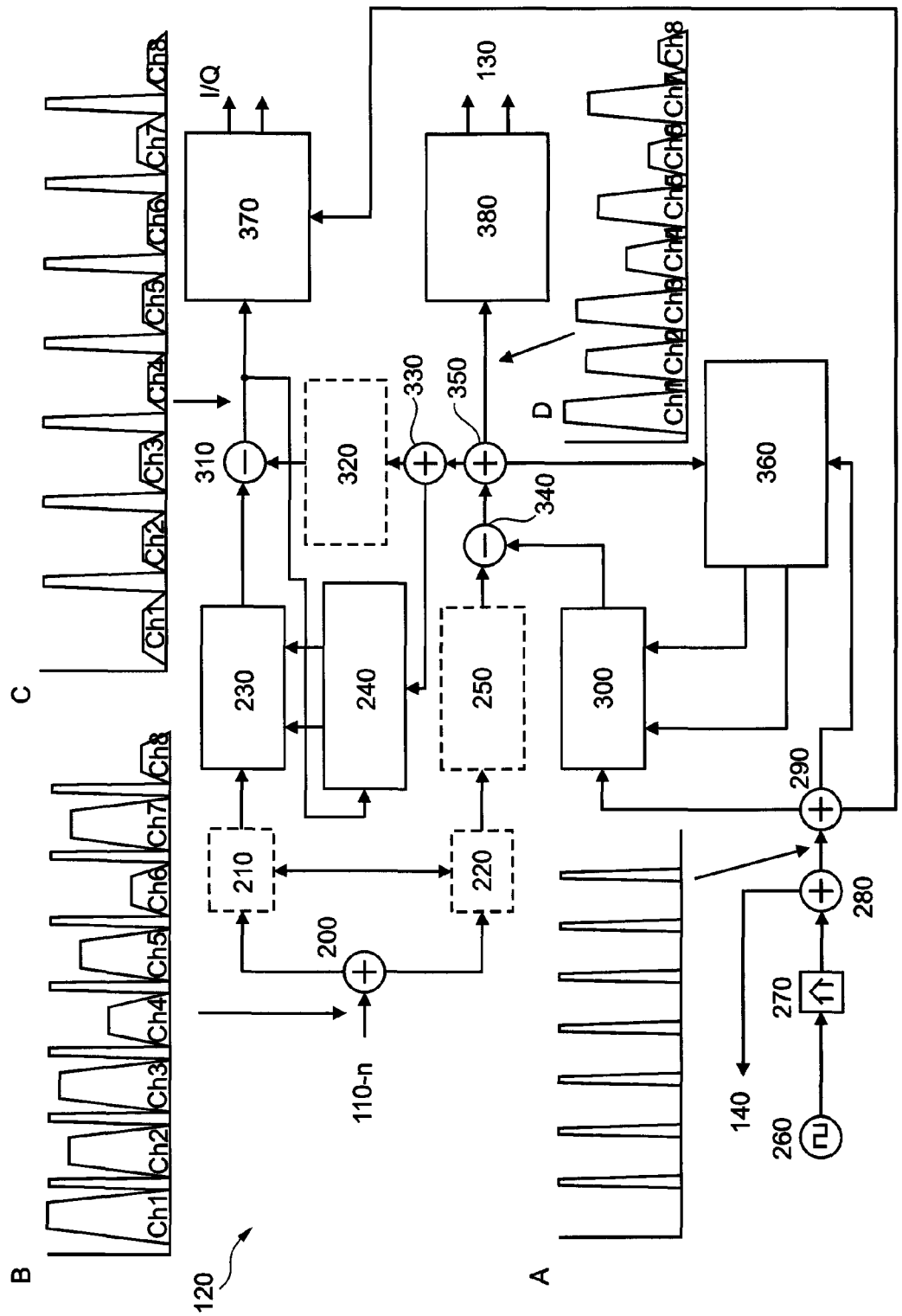
FIG. 2 shows an overview of subtraction signal processing and control systems according to an aspect of this invention.

FIG. 2 shows an outline of the subtraction signal processing and control systems that occur in the digital signal processor 120 of FIG. 1. FIG. 2 has four inserts A, B, C and D that illustrate the radio spectra along certain paths within the digital signal processor 120, as will be explained later. An input at a first splitter 200 comes from the delta-sigma analogue to digital converter 110-n located in an individual one of the receive paths 30-1, 30-2, . . . , 30-n and is shown in insert B. The input at the first splitter 200 is the digitised receive signal. It will be noted at this point that the subtraction signal processing and control systems are only shown for a typical one of the receive paths 130-n, in FIG. 2, and will only be described with respect to a typical one of the receive paths 130-n. An identical operation will be carried out for all of the outputs of the delta-sigma analogue-to-digital converter 110-1, 110-2, . . . , 110-n in this aspect of the invention.

It was noted above that FIGS. 3 and 4 show, however, another aspect of the invention as will be explained with the respect to these Figures.

The radio spectrum entering the first splitter 200 is the digital receive signal and is shown in insert B in an exemplary manner. The radio spectrum of insert B shows eight channels with inter-band calibration signals. The channel signals are labelled Ch1, Ch2, . . . Ch8. The inter-band calibration signals are not labelled in this insert, but are clearly visible as the sharp peaks in the insert B. The output of the first splitter 200 is passed to a first controller 230 and a second controller 250. Adaptive filters 210 and 220 can be used to correct for gain and phase variations ("ripple") in the digital receive signal, across the frequency band of interest, for example those introduced by the analogue filtering components in the receive paths 30-1, 30-2, ..., 30-n.

The digital receive signals are then passed to the first controller 230 and/or the second controller 250. The function of the first controller 230 and the second controller 250 is to change the gain and phase of the digital receive signals coming from the first splitter 200, either directly using gain and phase controlling functions, or indirectly through changing the I and Q scaling values of the digital receive signals using vector processing (sometimes referred to as a 'vector modulator'). It will be appreciated that the second controller 250 and the second adaptive filter 220 can be used interchangeably with the first adaptive filter 210 and the first controller 230 and that both the first adaptive filter 210 and the second adaptive filter 220 and/or the first controller 230 and the second controller 250 may not be present in this aspect of the invention. The amount of gain/phase or vector modulation is controlled by an input from the first control and correlation system 240 as will be explained later. This input could consist of more than one control signal path.

The digital signal processor 120 has in this aspect of the invention a single sounding signal generator 260 that generates a sounding signal in the digital domain. The sounding signal is up-converted to digital IF in an IF up-converter 270 and passed to a second splitter 280. One of the outputs of the second splitter 230 is passed to the delta-sigma digital-to-analogue converter 140 shown in FIG. 1 to produce the analogue sounding signal in the analogue domain. Another one of the outputs of the second splitter 280 is passed to a third splitter 290. The function of the sounding signal generator 260 is to produce a sounding signal in the digital domain that is used in digital signal processor 120 to calibrate the active antenna array 10 of FIG. 1. One exemplary sounding signal is shown in insert A which produces a plurality of sounding signals at inter-band channels. Each of the plurality of sounding signals shown in FIG. 2, insert A, has substantially the same strength and is located at a frequency which is between the channels on which the receive signals are received. This is illustrated in more detail in insert B.

It will be further appreciated that the plurality of sounding signals shown in insert A are only one example of sounding signals that may be used in the sounding of the active antenna array 10 of this disclosure. It would, for example, be possible to use a broad sounding signal present at all frequencies of interest or to omit one or more of the inter-band sounding signals. It would furthermore be possible to have a sounding signal generator 260 present in a different element of the circuit and not present in the digital signal processor 120. In this case the sounding signal would need to be sampled by an analogue to digital converter and fed into the digital signal processor 120.

The output of the third splitter 290 is passed to an input of a third controller 300, to an input of a fourth controller 360 and to an input of a sounding signal processor 370. The function of the third controller 300 is to alter the gain and phase of the sounding signal, or to vector modulate the sounding signals, to produce a modified sounding signal. The inputs for the change of gain/phase or signal vector are received from a second control and correlation system 360. The function of the second control and correlation system 360 is, as indicated above, to calculate the gain/phase or the vector modulation that must be applied to the sounding signals in the third controller 300. The second control and correlation system 360 receives an input from the third splitter 290 and from a fifth splitter 350. The second control and correlation system 360 is therefore able to calculate parameters that are required for the operation of the third controller 300.

The output of the third controller 300 is passed to the second subtractor 340. The function of the second subtractor 340 is to subtract the modified sounding signal (as shown in insert A but modified in the third controller 300) from the digitised receive signal (as shown in insert B, but modified as explained later). It will be appreciated therefore that the third controller 300 applies gain/phase or vector modification to the sounding signal in order to ensure an accurate subtraction of the sounding signal from the digitised receive signal.

It will be noted that in both the control system processing and the subtraction processing that it may be necessary to insert additional delay in order to ensureinsure that the signals to be subtracted or correlated appear with equal time delays, irrespective of the signal path to the correlation processes or subtraction processes. For example, it may be necessary to include a time delay element within the third controller 300 to compensate for delays in analogue receive components, such as mixers, filters and amplifiers. Likewise, it may be necessary to include a time delay on the sounding signal input on the second control and correlation system 360 to compensate for same or similar delays in the analogue receive components. This compensation will also be necessary for carrier signal subtraction process at a first subtractor 310 and its associated first control and correlation system 240.

It will be noted, at this point, that the second controller 250 is optional, since it is possible that all of the required gain/phase or vector modulation of the digitised receive signals can be carried out in the third controller 300. The output of the second subtractor 340 is passed to a fifth splitter 350. The output of the second subtractor 340 (and also of the fifth splitter 350) is shown in insert D and it will be noted that insert D comprises primarily the receive signals in the various receive channels with only a small residual sounding signal which has not been subtracted in the second subtractor 340. The output of the fifth splitter 350 is also passed to the first control and correlation system 240 through a fourth splitter 330 and also to a fourth controller 320. It has been previously noted that the output of the fifth splitter 350 is applied to the second control and correlation system 360.

The output of the first control and correlation system 240 is applied to the digitised receive signals before the digitised receive signals are passed to a first subtractor 310. The other input of the first subtractor 310 is from the fourth splitter 330. It will be recalled that the signal from the third splitter 330 is substantially the receive signal (as shown in insert D). The function of the first subtractor 310 is therefore to subtract the receive signal from the digitised receive signal (insert D) to thus obtain a processed sounding signal which is substantially that of the generated sounding signal from the sounding signal generator 260 after upconversion in the IF upconverter 270 and is shown in insert C. It will be appreciated that additional time delay elements may be required—but are not shown on FIG. 2—to ensure that the signals are correctly correlated.

The output of the first subtractor 310 is passed to the sounding signal processor 370 which compares the processed sounding signal with the generated sounding signal (insert A) at the third splitter 290 and is therefore able to correlate the processed sounding signal with the generated sounding signal and. The result of this correlation in the sounding signal processor 370 is to yield, either directly or indirectly, correction signals needed to update the calibration for the beam forming processes within the active antenna array 10.

The second control and correlation system 360 takes inputs from the fifth splitter 350 and the third splitter 290. The signal from the fifth splitter 350 contains largely received carrier signals, plus a small amount of residual energy from the sounding signal. The signal from the third splitter 290 contains energy from the sounding signal only. The second control and correlation system 360 uses the signals from the third splitter 290 and the fifth splitter 350, with appropriate delays added, to calculate values necessary to feed to the third controller 300 to insure that the maximum possible cancelation of the sounding signal occurs in the second subtractor 340.

The processed receive signal (insert D) is passed to a wanted signal processor 380 in which the processed receive signal is down-converted and processed, as required, to produce the I/Q baseband output signal 130.

Figure 3:
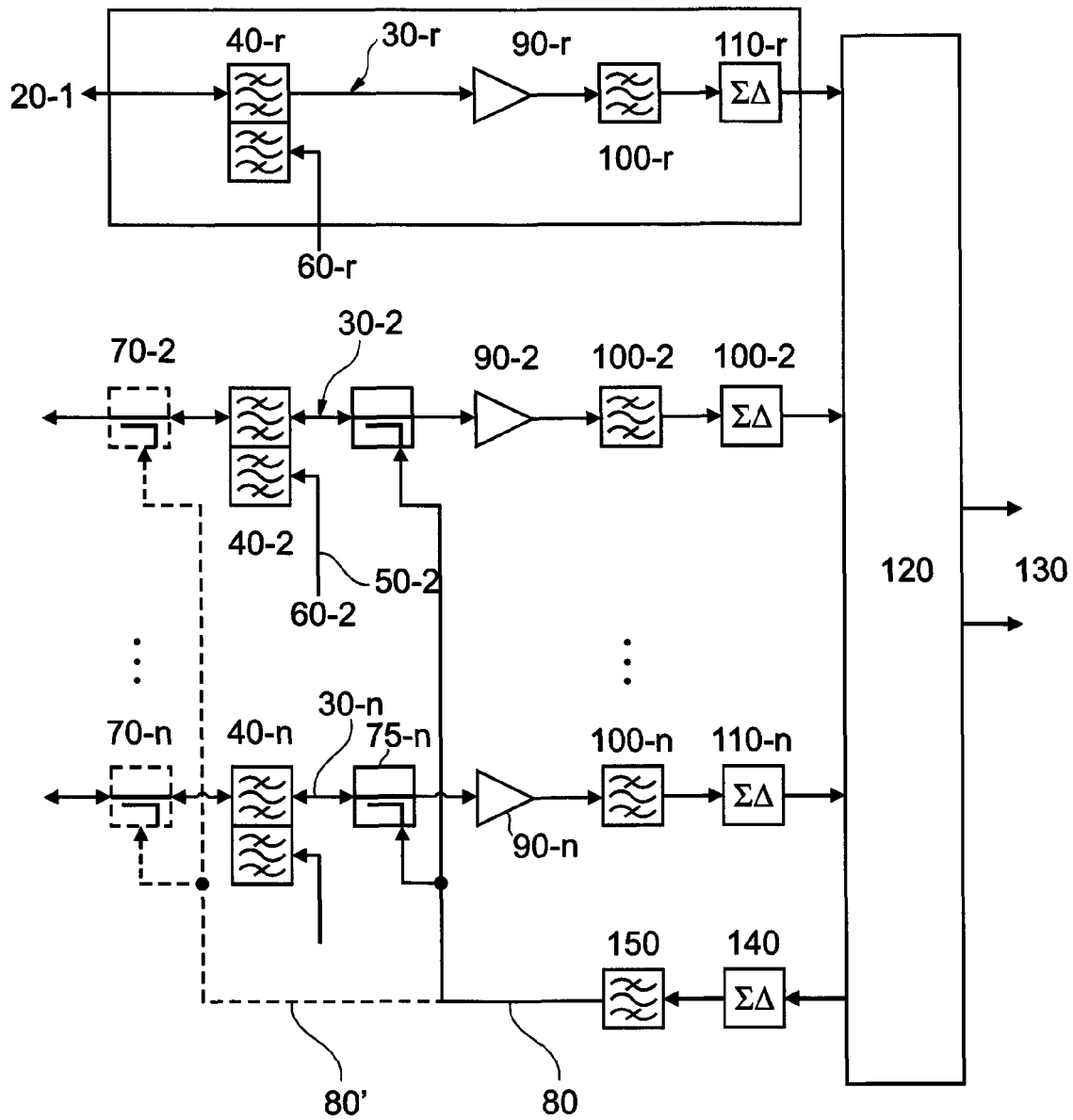
FIG. 3 shows a further aspect of the calibration scheme of the disclosure.

Another aspect of the invention is shown in FIG. 3 in which the topmost one of the receive paths 30-1, 30-2, . . . , 30-n, which will be designated 30-r, is used as a reference path. It is immaterial which one of the receive paths 30-1, 30-2, . . . , 30-n is used as the reference path 30-r. In the aspect shown in FIG. 3 the topmost receive path 30-1 was used. It will be appreciated that any one of the receive paths 30-2, . . . , 30-n could be used. The reference path 30-r differs from the other ones of the receive paths 30-1, 30-2, . . . , 30-n in that no sounding signal path 80 or 80' is connected to the reference path 30-r. In other words, the reference path 30-r can be used as the reference path for the other individual one of the receive paths 30-1, 30-2, . . . , 30-n and no sounding signal is applied to the receive signals from the antenna elements 20-1, 20-2, . . . , 20-n on this reference path 30-r. The other elements in FIG. 3 are identical with the elements in FIG. 1 and are numbered similarly.

Figure 4:
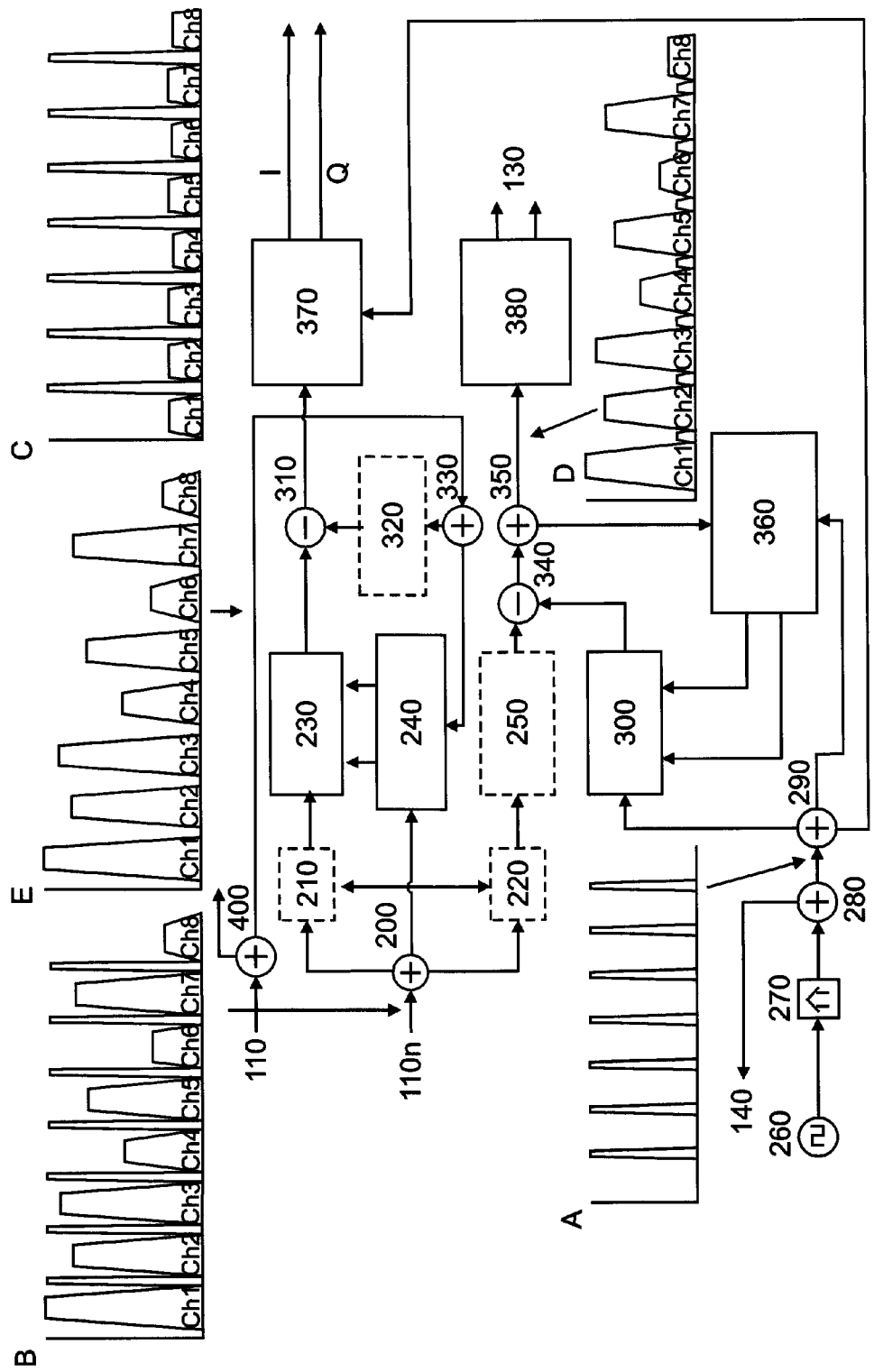
FIG. 4 shows an overview of the subtraction signal processing and control systems in which a reference path is used.

FIG. 4 shows an outline of the signal processing which is implemented in the digital signal processor 120 when the reference path 30-r is present. FIG. 4 is substantially identical with FIG. 2, except for the presence of the reference path 30-r shown at the topmost line of FIG. 4 that indicates a digitised receive signal from the delta-sigma analogue-to-digital converter 110-r in the reference path 30-r. The spectrum on the reference path 30-r is shown in insert E. It will be appreciated that the digitised receive signal on the reference path 30-r does not include any sounding signals, whereas the digitised receive signal on any one of the other individual receive paths 30-1, 30-2, . . . , 30-n will include the sounding signal, as is shown in insert D and discussed with respect to FIG. 2.

The output of the analogue-to-digital converter 110-r is passed to a sixth splitter 400. The function of the sixth splitter 400 is to pass the digitised receive signal on the reference path 30-r to the other paths within the digital signal processor 120, for the other digitised receive signals from the delta-sigma analogue-to-digital converters 110-1, 110-2, . . . , 110-n which include the sounding signal.

In this aspect of the invention shown in FIG. 4 the output from the sixth splitter 400 is a reference receive signal and is passed to the fourth splitter 330. The fourth splitter 330 is, in this example, not connected to the fifth splitter 350 (as it was in FIG. 3) and therefore does not receive the processed receive signal (insert D) but the original digitised receive signal (insert E). The output of the fourth splitter 330 is still passed to the first control and correlation system 240 and, if present, to the fourth controller 320. The first subtractor 310 then subtracts the reference receive signal (insert E) from the digitised receive signal (insert B) and passes the output to the sounding signal processor 370. This aspect of the invention enables all of the remaining receive signal paths, for example, 30-1, 30-2, . . . , 30-n, to be calibrated with respect to the reference path 30-r.

Figure 5:
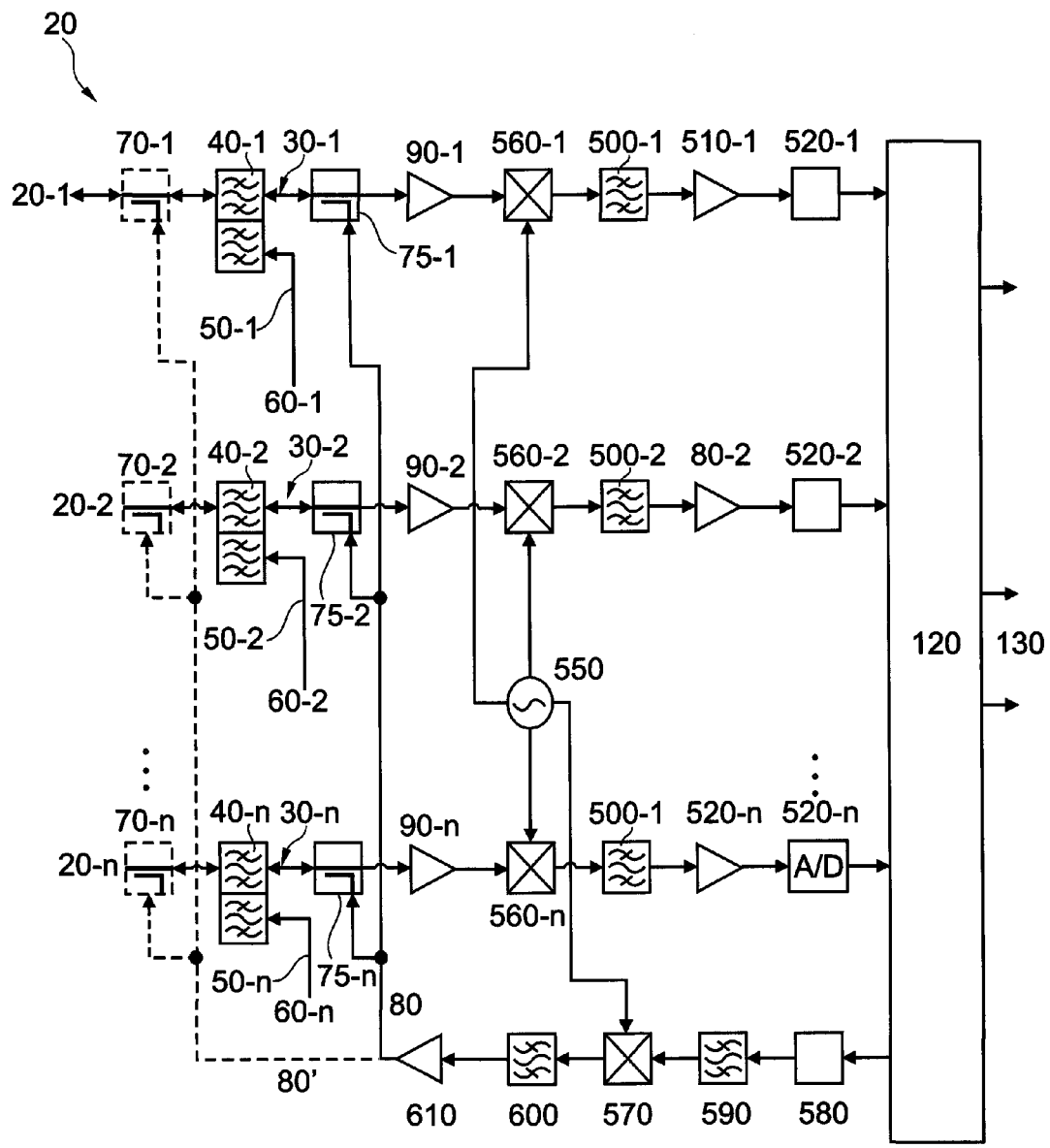
FIG. 5 shows a further calibration scheme of the disclosure.

A further aspect of the invention is shown in FIG. 5 in which a single upconversion/down conversion stage and conventional analogue-to-digital converters and digital-to-analogue converters are employed (rather than delta-signal analogue-to-digital converters and delta-sigma digital-to-analogue converters). Those elements of FIG. 5 which are identical to the elements of FIG. 1 and FIG. 3 have identical reference numerals. It will be observed that the sounding signal from the second splitter 280 is passed in this aspect of the invention to a digital-to-analogue converter 580, the output of which is connected to a fourth bandpass filter 590 to remove out-of-band signals. The sounding signal is upconverted in a sounding signal upconverter 570 that receives an oscillator signal from a local oscillator 550. The output of the sounding signal upconverter 570 is passed to a fifth bandpass filter 600 to remove out-of-band signals and then to an RF amplifier 610 to produce the sounding signal in the analogue domain on the pilot signal paths 80 and 80'.

In the receive direction, each individual one of the receive paths 30-1, 30-2, . . . , 30-n includes a low noise amplifier 90-1, 90-2, . . . , 90-n which passes the amplified receive signal and sounding t signal to a receive signal downconverter 560-1, 560-2, . . . , 560-n. The receive signal downconverters 560-1, 560-2, . . . , 560-n are also connected to the local oscillator 550 and receive the local oscillator signal from the local oscillator 550.

A third bandpass filter 500-1, 500-2, . . . , 500-n is connected to the output of the receive signal downconverters 560-1, 560-2, . . . , 560-n to remove out-of-band signals. The outputs of the receive signal downconverters 560-1, 560-2, . . . , 560-n are connected to an IF amplifier 510-1, 510-2, . . . , 510-n and then to an analogue-to-digital converter 520-1, 520-2, . . . , 520-n. The outputs of the analogue-to-digital converters 520-1, 520-2, . . . , 520-n are passed to the digital signal processor 120 for processing, as discussed above.

Note that more downconversion stages could be included in each individual of the receive paths 30-1, 30-2, . . . , 30-n, without departing from the scope of the invention. Each of these more downconversion stages would involve an additional mixer, band-pass filter and amplifier, similar to the receive signal downconverters 560-1, 500-1 and 510-1 in FIG. 5.

Figure 6:
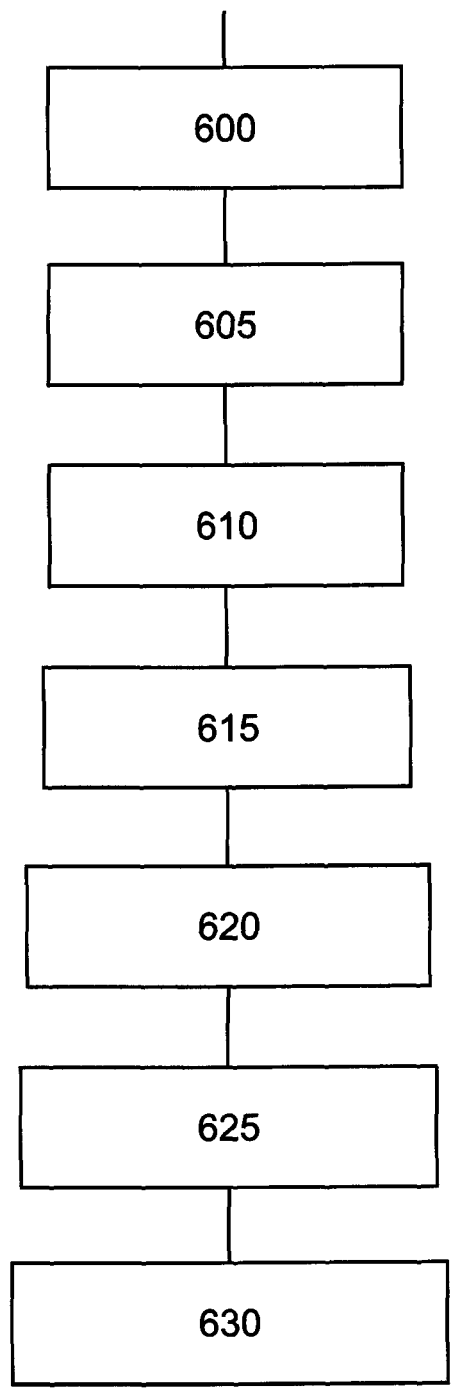
FIG. 6 shows an outline of the method used in the disclosure.

FIG. 6 shows an overview of the method according to one aspect of this disclosure. In step 600 the sounding signal (insert A of FIG. 2) is generated in the sounding signal generator 260 that is converted in the delta-sigma converter 140 or the digital-to-analogue converter 580 to the analogue sounding signal in the analogue domain in step 605. The analogue sounding signal is injected through analogue signal path 80 or 80' into at least two of the plurality of receive paths 30-1, 30-2, . . . , 30-n. It will be recalled that it is possible to use an individual one of the receive paths 30-1, 30-2, . . . , 30-n as a reference path 30-r. In this latter case the sounding signal is not injected into the reference path 30-r.

In step 620 the receive signals and the sounding signal are digitized in the delta-sigma analogue-to digital converter 110-1, 110-2, . . . , 110-n or the conventional analogue-to-digital converter 520-1, 520-2, 520, . . . , 520-n to form a digitized receive signal at the digital signal processor 120 which is received at the first splitter 200.

The sounding signal is subtracted from the digitized receive signal at step 620 in the second subtractor 340 to produce a wanted signal which is processed in the wanted signal processor 380 to produce the I/Q output signal 130.

In one aspect of the invention the wanted signal can be subtracted from the digitized receive signal in the first subtractor 310 to produce a sounding correlation signal that is passed to the sounding signal processor 370 in step 625. The sounding correlation signal is used in the sounding signal processor 370 to adjust the sounding signal.

In an alternative embodiment of the invention, as discussed above, the parameters are generated not with respect to a sounding signal, but with respect to a reference path 30-*r*.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer useable medium such as semiconductor, magnetic disc, or optical disc (e.g., CD-ROM, DVD-ROM, etc.). The software can also be disposed as computer data embodied in a non-transitory computer useable (e.g. readable) transmission medium (e.g., solid state memory any other non-transitory medium including digital, optical, analogue-based medium, such as removable storage media). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An active antenna array for a mobile communications system comprising:
    a plurality of receive paths, for carrying a plurality of analogue receive signals, an individual one of the receive paths being connected between an individual one of a plurality of antenna elements and an individual one of a plurality of analogue to digital converters;
    a sounding signal generator for generating a digital sounding signal;
    wherein an analogue sounding signal, based on the digital sounding signal, is injected to at least two of the plurality of receive paths; and
    wherein, for each receive path of said at least two of the plurality of receive paths, the individual one of the plurality of analogue to digital converters is configured to digitize the analogue receive signal and the analogue sounding signal to form a digitized receive signal;
    a receive signal subtraction device for subtracting a processed digitized receive signal from the digitized receive signal to generate a processed digitized sounding signal; and a sounding signal subtraction device for subtracting the digital sounding signal from the digitized receive signal to form the processed digitized receive signal.

2. The active antenna array of claim 1, wherein a digital to analogue converter is connected between the sounding signal generator and the at least two of the plurality of receive paths.

3. The active antenna array of claim 1, wherein the sounding signal generator is adapted to produce at least one of a plurality of inter-band digital sounding signals or broadbrand digital sounding signals.

4. The active antenna array of claim 1, wherein one of the receive paths is a reference receive path without the injected digital sounding signal and therefor used only for carrying the processed digitized receive signal.

5. The active antenna array of claim 1, wherein the analogue to digital converters are delta-sigma analogue to digital converters.

6. The active antenna array of claim 1, wherein the individual one of the receive paths further comprises a duplex filter between the individual one of the plurality of analogue to digital converters and the individual one of the plurality antenna elements, the duplex filter being adapted to enable transmit signals to be transmitted on the individual one of the plurality of antenna elements.

7. The active antenna array of claim 6, wherein the individual one of the plurality of analogue to digital converters is connected to the receive path between the duplex filter and the individual one of the plurality of antenna elements.

8. The active antenna array of claim 1, further comprising, on each receive path of the plurality of receive paths, an individual one of the plurality of filter elements to filter unwanted signals from the digitized receive signals.

9. The active antenna array of claim 1, further comprising:
    a receive signal correlator and control system for adjusting one of the phase, amplitude or vector of the digitized receive signal.

10. The active antenna array of claim 1, further comprising:
    a sounding signal correlator and control system for adjusting one of the phase, amplitude or vector of the digital sounding signal.

11. The active antenna array of claim 1, wherein a digital signal processor generates an I/Q baseband output signal, for each receive path of the plurality of receive paths, based on the processed digitized receive signal for each receive path of the plurality of receive paths.

12. A method for calibration of a plurality of receive paths carrying analogue receive signals comprising:
    generating a digital sounding signal;
    converting the digital sounding signal to form an analogue sounding signal;
    injecting the analogue sounding signal into at least two of the plurality of receive paths;
    digitizing, for each receive path of said at least two of the plurality of receive paths, the analogue receive signal and the analogue sounding signal to form a digitized receive signal;
    subtracting, for each receive path of said at least two of the plurality of receive paths, a processed digitized receive signal from the digitized receive signal to form a processed digitized sounding signal; and subtracting the digital sounding signal from the digitized receive signal to form the processed digitized receive signal.

13. The method of claim 12, further comprising generating parameters for processing the processed digitized receive signal, wherein the parameters are generated by comparing the processed digitized sounding signal and the digital sounding signal.

14. The method of claim 12, wherein one of the receive paths is a preferential receive path without the infected digital sounding signal and therefor used only for carrying the processed digitized receive signal and the parameters are generated by reference to the preferential receive path.

15. The method of claim 12 further comprising:
adjusting one of phase, amplitude or vector of the digitized receive signals.

16. The method of claim 12 further comprising:
adjusting one of phase amplitude or vector of the digital sounding signal.

17. The method of claim 12, further comprising:
generating an I/Q baseband output signal, for each receive path of the plurality of receive paths, based on the processed digitized receive signal for each receive path of the plurality of receive paths.

18. A computer program product comprising a non-transitory computer-usable medium having control logic stored therein for causing a computer to manufacture an active antenna array for a mobile communications network comprising:
a plurality of receive paths, for carrying a plurality of analogue receive signals, the individual one of the receive paths being connected between an individual one of a plurality of antenna elements and an individual one of the plurality of analogue to digital converters, the individual one of the plurality of analogue to digital converters digitizing an analogue receive signal;
a sounding signal generator for generating a digital sounding signal;
wherein an analogue sounding signal, based on the digital sounding signal, is injected to the at least two of the plurality of receive paths; and
for each receive path of said at least two of the plurality of receive paths, the individual one of the plurality of analogue to digital converters is configured to digitize the analogue receive signal and the analogue sounding signal to form a digitized receive signal;
a receive signal subtraction device for subtracting a processed digitized receive signal from the digitized receive signal to generate a processed digitized sounding signal; and a sounding signal subtraction device for subtracting the digital sounding signal from the digitized receive signal to form the processed digitized receive signal.

19. A computer program product comprising a non-transitory computer-usable medium having control logic stored therein for causing an active antenna to execute a method for receiving analogue receive signals comprising:
generating a digital sounding signal;
converting the digital sounding signal to form an analogue sounding signal;
injecting the analogue sounding signal into at least two of the plurality of receive paths
digitizing, for each receive path of said at least two of the plurality of receive paths, the analogue receive signal and the analogue sounding signal to form a digitized receive signal; and
subtracting a processed digitized receive signal from the digitized receive signal to generate a processed digitized sounding signal; and
subtracting the digital sounding signal from the digitized receive signal to form the processed digitized receive signal.

* * * * *

UNITED STATES PATENT AND TRADEMARK OFFICE
CERTIFICATE OF CORRECTION

PATENT NO. : 8,441,966 B2  
APPLICATION NO. : 12/751391  
DATED : May 14, 2013  
INVENTOR(S) : Peter Kenington et al.

Page 1 of 1

It is certified that error appears in the above-identified patent and that said Letters Patent is hereby corrected as shown below:

In the Claims:

Column 10, Claim 6, lines 26-27, "one of the plurality antenna elements"
should read -- "one of the plurality of antenna elements" --;

Column 10, Claim 8, line 37, "digitized receive signals"
should read -- "digitized receive signal" --;

Column 11, Claim 14, line 10, "without the infected digital"
should read -- "without the injected digital" --;

Column 11, Claim 15, lines 15-16, "digitized receive signals"
should read -- "digitized receive signal" --;

Signed and Sealed this
Sixteenth Day of July, 2013

Teresa Stanek Rea
*Acting Director of the United States Patent and Trademark Office*